United States Patent [19]

Reed

[11] Patent Number: 4,612,723
[45] Date of Patent: Sep. 23, 1986

[54] WILD ANIMAL TRAP

[76] Inventor: Ronald D. Reed, 2120 Shirley La., Choctaw, Okla. 73020

[21] Appl. No.: 657,560

[22] Filed: Oct. 4, 1984

[51] Int. Cl.⁴ ............... A01M 23/18; A01M 23/00
[52] U.S. Cl. ................................... 43/61; 43/60
[58] Field of Search ............... 43/61, 58, 60

[56] References Cited

U.S. PATENT DOCUMENTS

| | | |
|---|---|---|
| 1,913,823 | 6/1933 | Witte .................. 43/61 |
| 2,499,682 | 3/1950 | Reeb .................. 43/61 |
| 2,566,176 | 8/1951 | Ellis .................. 43/61 |
| 2,573,228 | 10/1951 | Slauth ................ 43/61 |
| 3,174,250 | 3/1965 | Gilbert ............... 43/61 |
| 3,426,470 | 2/1969 | Rudolph .............. 43/61 |

FOREIGN PATENT DOCUMENTS 18679 of 1911 United Kingdom .................. 43/61

Primary Examiner—Nicholas P. Godici
Assistant Examiner—Christopher L. McKee
Attorney, Agent, or Firm—Robert K. Rhea

[57] ABSTRACT

In a humane wild animal trap elongated wall structure forms a passageway longitudinally disposed in the pathway normally used by an animal to be trapped. One end of the passageway is closed and a hinged door, normally maintained open by trigger released linkage, is tripped by an animal in the passageway to close the door and trap the animal.

When trapping beaver, or the like, one end of the trap is disposed at a submerged beaver lodge opening with the other end of the trap elevated out of the water by vertically adjustable supporting legs to insure an air supply for the trapped animal.

3 Claims, 3 Drawing Figures

WILD ANIMAL TRAP

BACKGROUND OF THE INVENTION

1. Field of the invention

The present invention relates to animal traps and more particularly to a trap for wild animals, such as beaver.

It is well known that beaver enhance the environment particularly along streams subject to soil erosion. The dam building beaver prevents rapid water runoff and drainage. For this reason beaver are being trapped and relocated along streams subject to soil erosion as a result of deforestation. Also, beaver frequently migrate into or adjacent residential areas and frequently do material damage to home owner's shade or other trees and it is desirable, from the home owner's view point, to capture and relocate the beaver.

2. Description of the prior art

U.S. Pat. No. 3,174,250 discloses an elongated wire wall trap having opposing open ends closeable by a pair of doors, biased toward a closed position, when released to close by a pair of springs. An animal tripped trigger lever, disposed centrally of the trap, depends from its upper limit and is operatively connected with a trigger connected with the respective door by chains so that an animal, moving in either direction through the trap, moves the trigger lever to release the trigger and the chains so that the doors close.

SUMMARY OF THE INVENTION

An elongated woven wire wall trap has its animal entry end opened and closed by a hinged door. The open end of the trap is disposed in substantial coaxial alignment with the submerged beaver lodge exit with the opposite end portion of the trap elevated above the surface of the water and held in such position by vertically adjustable legs secured to the trap. In its cocked position, the door is maintained open by a trigger and linkage. A trigger release intersects the beaver's passageway through the trap and, when moved by the beaver, releases the door to fall by gravity and spring tension to a closed beaver trapped position.

The principal object of this invention is to provide an animal trap for beaver, or the like, which may be partially immersed in a body of water with one end above the level thereof to provide air for an animal when trapped therein and which does not injure the trapped animal.

DESCRIPTION OF THE PREFERRED EMBODIMENTS

Figure 1:
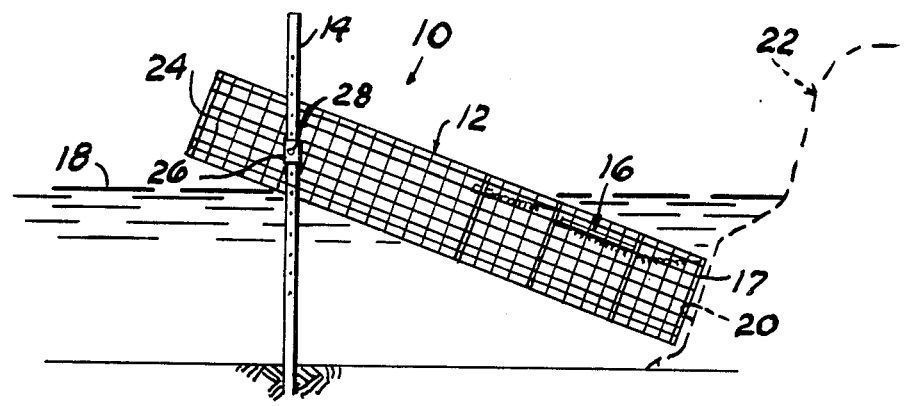
FIG. 1 is a side elevational view of the trap, when in operative position, illustrating its relation to a body of water containing a beaver lodge.

Like characters of reference designate like parts in those figures, of the drawings in which they occur.

In the drawings:

The reference numeral 10 indicates the trap, as a whole, comprising a hollow housing 12, a pair of legs 14, only one being shown, supporting one end of the housing and trap door and trigger means 16. The trap housing 12 is cylindrical in the example shown but may be of other transverse configuration, if desired. The trap housing 12 is preferably formed from hardware cloth of selected gauge or may be formed from woven wire closely woven on a dimension sufficient to maintain the smallest animal to be trapped therein. The diameter of the housing is also selected in accordance with the size of the animal to be trapped and its length is such that one open end, defined by an end ring 17, may be disposed below the surface of a body of water, indicated by the line 18, adjacent the submerged entrance 20 of a beaver lodge 22 with the other or closed end 24 disposed above the surface of the water. The longitudinal axis of the housing is thus inclined at a selected angle permitting an animal entering the trap at its open end 17 to easily progress toward its closed end 24, as presently explained.

The pair of legs 14 are preferably relatively small tubes of selected length slidably received by a pair of sleeves 26, only one being shown, secured to diametrically opposite sides of the housing 12 adjacent its end 24. The legs 14 are provided with a longitudinal row of spaced transverse apertures for receiving a pin 28 projecting through an opening in the respective sleeve and supporting the closed end of the trap at a desired elevation above the surface of the water.

The trap door and trigger means 16 comprise a trap door 30, a door latch 32 and trigger means 34. The trap door 30 is preferably formed from a section of sheet metal having a perimeter conforming to the cross section configuration of the inner wall surface of the housing 12 and is transversely secured thereto at a position spaced forwardly of the housing open end 17. The sheet metal is centrally apertured to form a circular door 36 surrounded by a door ring 37. The door 36 is hingedly secured, as at 38, to the upper limit of the inner periphery of the door ring so that the door 36 may pivot forwardly within the trap housing 12.

The door 36 is normally urged toward a closed position by gravity and a spring 39. The respective end of the spring 39 is connected with the depending edge portion of the door 36 and the upper limit of the housing open end 17.

Prongs or lugs 40, secured to the door ring, project radially inward of its inner periphery to maintain the door 36 in the plane of the door ring 37 when the door is in closed position, as presently explained.

The door latch 32 is right angular in side elevation and is pivotally mounted at its right angular corner on a rod 42 horizontally subtending an upper chord of a housing stiffener ring 44 secured to the inner perimeter of the housing 12 and spaced forwardly of the trap door 36 a distance, such that one leg 46 of the latch 32 underlies the adjacent edge portion of the door 36. The other upstanding leg 48 of the door latch is secured to one end of a trigger spring 50 with the other end of the spring secured to an elongated clip 52 having at least one notch 54 therein frictionally engaging an intermediate portion of a trigger support rod 56, similarly subtending a chord of a stiffener ring 58 spaced a selected distance forwardly of the stiffener ring 44. The trigger rod 56 also pivotally supports the trigger 34 for forward and rearward swinging movement about the axis of the trigger rod 56.

The trigger 34 comprises a plurality of laterally spaced prongs 60 secured to a prong base 62 parallel with and pivotally secured to the trigger rod 56 so that forward movement of the trigger 34 moves a clip release lug 64 against the depending surface of the clip 52 to disengage it from the trigger rod 56 and release the door 36.

The wall of the housing 12 is preferably provided with a trigger access door, not shown, overlying the trigger for ease in manually setting the trigger.

OPERATION

Figure 2:
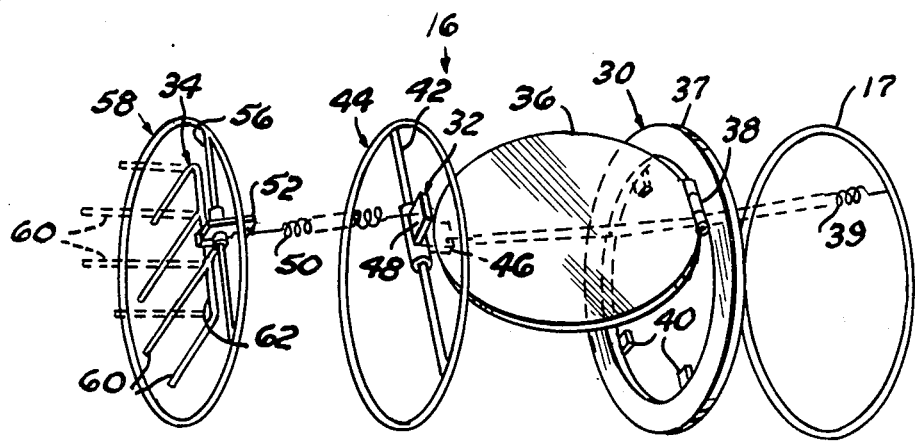
FIG. 2 is a fragmentary perspective view, to a larger scale, with the trap wall removed for clarity, illustrating the trigger and trap door mechanism in cocked position; and, FIG. 3 is a fragmentary side elevational view, to a further enlarged scale, illustrating the manner in which the trigger releases the trap door latch from a cocked position.
Figure 3:
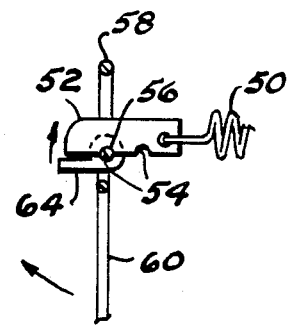

In operation, with the trigger means in cocked position, the open end 17 of the trap housing is disposed adjacent a beaver lodge opening 20 and the trap supporting legs 14 disposed vertically and secured by the pins 28 to elevate the closed end of the trap above the surface of the water. The legs having been manually pushed downwardly into any soft mud present in the lake or stream bottom to prevent submersion of the trap in response to the mass of a tfapped beaver. The door 36 is pivoted to its trap open position and is held in place by the latch and trigger mechanism, as described hereinabove. A beaver, not shown, leaving the submerged lodge exit normally quickly swims forwardly to rise to the water surface and thus enters the trap housing and moves through the submersed end portion thereof thus pivoting the trigger 34 in a forward direction, as shown by dotted lines (FIG. 2), which releases the trap door to close between him and the open end 17 of the trap. The beaver may enter the forward air exposed end of the trap to prevent drowning.

Since the trap is relatively lightweight it may be used for transporting the trapped beaver to a place of release for the beaver.

When using the trap in a manner other than that just described it seems obvious that both ends of the housing may be open and have a second substantially identical trap door and trigger means installed in its other end portion with both doors being closed simultaneously by actuation of the trigger 34.

Obviously the invention is susceptible to changes or alterations without defeating its practicability. Therefore, I do not wish to be confined to the preferred embodiment shown in the drawings and described herein.

I claim:

1. A trap for an aquatic fur bearing animal, comprising:
    an elongated wall structure defining a passageway having one closed end and its open end adapted to be axially aligned with an animal burrow opening submerged in a body of water;
    leg means for supporting the closed end and a portion of the passageway above the water level of the body of water, said leg means comprising a pair of sleeves with each sleeve having a transverse opening and secured in diametric opposition to the outer surface of said wall structure adjacent its closed end, a pair of legs respectively longitudianlly slidably received by each sleeve of said pair of sleeves, each leg of said pair of legs having a series of longitudinally spaced transverse apertures, and, a pin extending through each sleeve and a selected one of the apertures in the respective said leg;
    closure means top hinge mounted to the passageway wall adjacent its open end;
    resilient means normally biasing the closure means in one direction;
    a horizontal trigger rod extending transversely of the passageway;
    a trigger swingably mounted transversely of the passageway for vertical movement about the horizontal axis of the trigger rod; and,
    trigger setting means for normally holding said closure means and trigger in cocked position.

2. The animal trap according to claim 1 in which said trigger setting means includes:
    latch means supported by the passageway wall for normally holding said closure means in a passageway open end position; and,
    clip means engaging said trigger rod and biasing said latch means toward a closure means open position.

3. The animal trap according to claim 2 in which the closure means includes:
    an annular ring member transversely secured to the inner periphery of the passageway wall; and,
    a door nested by the inner periphery of the ring member when in closed position.

* * * * *